(No Model.)
W. LANGMUIR.
CUSHION TIRE.
No. 502,731. Patented Aug. 8, 1893.
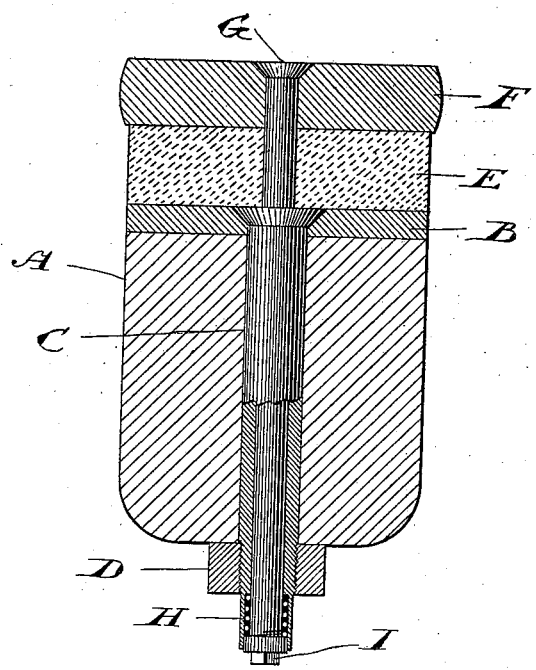
Witnesses
J. Edw. Maybee
W. J. McMillan
Inventor
Woodburn Langmuir
by
Donald C. Ridout & Co.
Attys

UNITED STATES PATENT OFFICE.

WOODBURN LANGMUIR, OF TORONTO, CANADA.

CUSHION-TIRE.

SPECIFICATION forming part of Letters Patent No. 502,731, dated August 8, 1893.

Application filed November 7, 1892. Serial No. 451,188. (No model.)

*To all whom it may concern:*

Be it known that I, WOODBURN LANGMUIR, of the city of Toronto, in the county of York, in the Province of Ontario, Canada, have invented a certain new and Improved Cushion-Tire, of which the following is a specification.

The object of the invention is to secure a cushion tire specially suitable for heavy vehicles, and it consists in the peculiar construction, arrangement and combinations of parts hereinafter more particularly described and then definitely claimed.

The drawing represents a cross-section of my improved tire.

A, is a felly.

B, is a metal band placed on the felly and secured in position by a hollow bolt C. The head of this bolt is counter-sunk into the metal band B, so that the top of its head shall be flush with the surface of the band. This bolt is secured in position by the nut D.

E, is a rubber band placed next to the band B, and having an outer metal band F, placed on it.

G, is a bolt passing through the outer band F, the rubber band E, the band B, and the hollow bolt C. The bolt G, is made an easy fit through the hollow bolt C. The hole in the bolt C, is enlarged near its point so that a spiral spring H, can be placed round the bolt G, and inside of the enlarged portion of the hole through the bolt C. One end of the spring H, abuts against the shoulder at the bottom of the enlargement, the other end abutting against the nut I, screwed upon the bolt G. The tension of the spring H, is made strong enough to hold the bolt G, from falling out, the only object of the bolt being to prevent lateral movement of the outer band F, and the rubber band E. Instead of having the bolt G, passed entirely through the bolt C, the lower portion of it might be cut off and the upper portion fixed to the band F.

It will be seen that a tire made in this manner will have the necessary elasticity and be specially adapted for heavy vehicles.

What I claim as my invention is—

1. An improved cushion tire, comprising an inner metal band bolted to a felly by a hollow bolt, an outer metal band, a rubber band placed between said inner and outer bands, and a bolt projecting through the rubber and metal bands and into the hollow bolt, substantially as described.

2. An improved cushion tire, consisting of an inner metal band bolted to the felly by a hollow bolt, an outer metal band, a rubber band placed between the inner and outer metal bands, a bolt projecting through the metal and rubber bands and held in position by a nut and spring; substantially as and for the purpose specified.

Toronto, October 24, 1892.

WOODBURN LANGMUIR.

In presence of—
J. EDW. MAYBEE,
W. G. MCMILLAN.